United States Patent [19]

Chateau et al.

[11] 4,076,278
[45] Feb. 28, 1978

[54] LATERALLY ENGAGEABLE FLOWLINE CONNECTOR DEVICE

[75] Inventors: Georges M. Chateau, Pau, France; Praful Desai, Huntington Beach, Calif.

[73] Assignee: Societe Nationale Elf Aquitaine (Production), Courbevoie, France

[21] Appl. No.: 763,110

[22] Filed: Jan. 27, 1977

[51] Int. Cl.² .................. F16L 35/00; F16L 55/00
[52] U.S. Cl. .................................. 285/18; 285/325
[58] Field of Search .............. 285/18, 325, 86, 321, 285/315, 316; 403/331

[56] References Cited

U.S. PATENT DOCUMENTS

| | | | |
|---|---|---|---|
| 2,735,684 | 2/1956 | Longee et al. | 403/331 X |
| 3,096,831 | 7/1963 | Adams | 403/331 X |
| 3,321,217 | 5/1967 | Ahlstone | 285/86 X |
| 3,492,027 | 1/1970 | Herring | 285/18 |
| 3,558,160 | 1/1971 | Falkner | 285/18 |
| 3,807,497 | 4/1974 | Baugh | 285/18 |

Primary Examiner—Wayne L. Shedd
Attorney, Agent, or Firm—Poms, Smith, Lande & Glenny

[57] ABSTRACT

A flowline connector device for subsea well operations in which a connector means on the end of the flowline is moved laterally into position for connection to a fixed connector means on a subsea station. The connector means on the subsea station includes an axially movable mandrel located within a chamber in a body member, the mandrel having sealing surfaces at one end thereof juxtaposed to sealing surfaces on the flowline connector member when laterally positioned. A fluid pressure actuated locking means moves said sealing surfaces on the mandrel into sealed relationship with the sealing surfaces on the flowline connector member and locks the sealing surfaces in fluid tight sealed relation. A mechanical backup lock means for the mandrel is carried by the connector means on the subsea station for positively and unyieldingly mechanically locking the mandrel in fluid tight sealed relation. In the event of a drop in fluid pressure, leakage at the sealing surfaces is prevented by the mechanical locking device.

10 Claims, 6 Drawing Figures

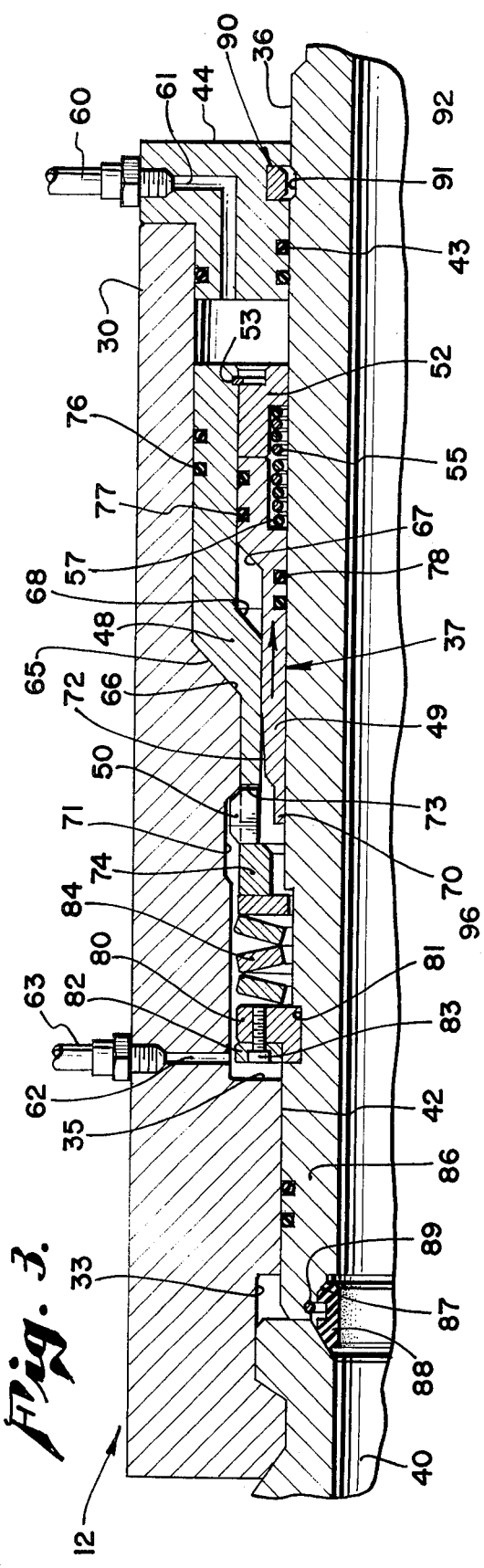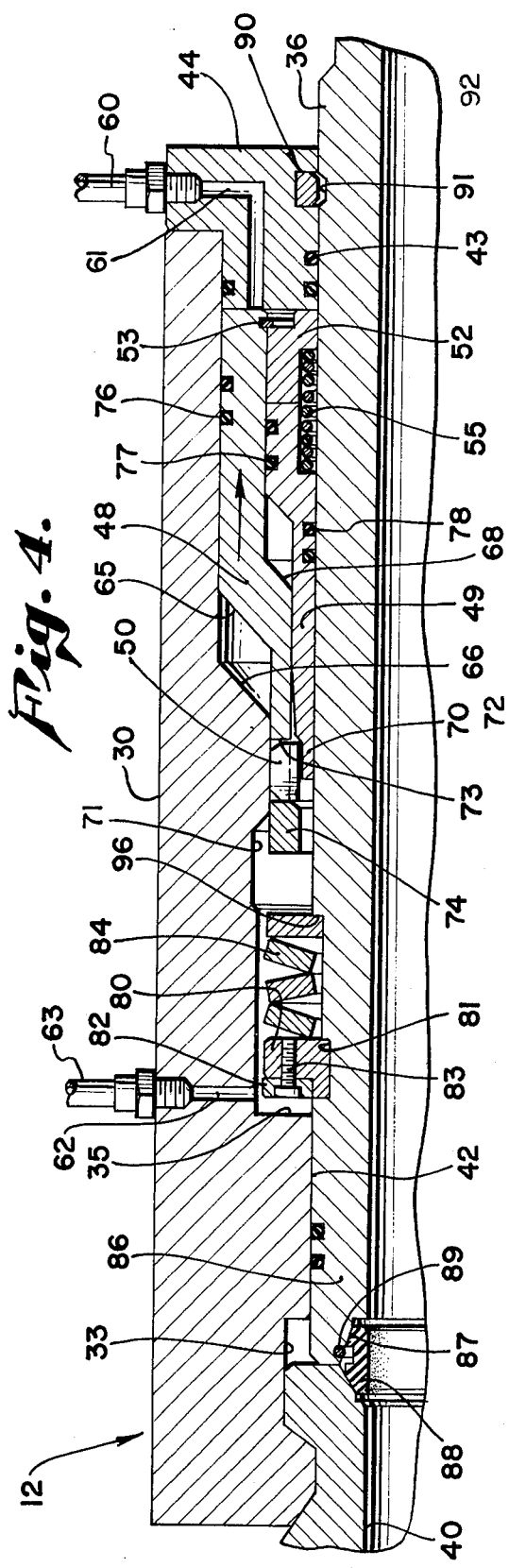

LATERALLY ENGAGEABLE FLOWLINE CONNECTOR DEVICE

BACKGROUND OF INVENTION

In subsea well installations, a longitudinally extending flowline has an end which is brought into axial alignment with another flowline or fluid conducting pipe for interconnection of such lines and for providing a fluid tight seal connection. In some installations, one or both of the fluid conducting lines are axially movable relative to the other to bring the ends of the lines into close proximity, coupling the ends together, and providing a fluid tight seal at the coupling. In some underwater conditions, it is often difficult to move a flowline laid on the sea floor in an axial direction to bring its connector end into proximity with the connector end of a line to which it is to be connected because of the weight of the flowline, possible embedment of the flowline in the sea floor, or frictional resistance of the flowline with the sea floor. In subsea stations, end to end positioning of fluid conducting lines with precise axial alignment is often difficult to achieve; out of axial alignment conditions may prevent proper coupling and fluid tight sealing at the coupling.

Prior proposed fluid conducting line connecting devices have been actuated by fluid pressure and the fluid pressure has been relied upon to maintain the sealed relation of the coupling or connection. In the event fluid pressure was not maintained or there was a partial failure of the desired fluid pressure, the connecting device may leak at the sealing surfaces. Leakage of production or hydrocarbon fluids into the sea water is undesirable not only because of loss of production fluid, but also because of environmental pollution.

A flowline pipe end provided with a rotatable connector member has been moved laterally onto a support and then mechanical gear means associated therewith to move the rotatable connector axially into sealed relationship with a surface on a wellhead. See U.S. Pat. Nos. 3,502,354 and 3,593,408.

SUMMARY OF INVENTION

The primary object of the present invention is to provide a flowline connector device embodying a novel fluid pressure actuated lock and seal means and a backup mechanical lock for maintaining such seal in the event fluid pressure is reduced or lost.

An object of the present invention is to provide a flowline connector device in which fluid actuated means urge sealing surfaces into fluid tight sealing relation and actuates locking means to maintain such sealed relationship.

Another object of the invention is to provide a flowline connector device as mentioned above wherein after the fluid actuating means has locked said sealing surfaces in fluid tight relation, a mechanical lock means is operable to maintain such sealed relationship.

A further object of the present invention is to provide a flowline connection in which lateral relative movement of mating connector means and minimal relative axial movement of the connector means is provided for achieving a fluid tight seal.

A still further object of the invention is to provide a flowline connection in which sealing surfaces are retained in fluid tight sealing relation by hydraulic pressure actuated lock means and by mechanical lock means.

A still further object of the present invention is to disclose a flowline connection wherein the arrangement of the connector members and their sealing surfaces assures a fluid tight sealing relationship when the connector members are in pressure locked condition.

Generally speaking this invention contemplates a first connector means adapted to be secured to the end of a flowline, the connector means having a sealing surface, a second connector means adapted to be secured to a subsea installation, said second connector means having a sealing surface, means on the connector means for interengagement thereof by movement of one connector means in a lateral direction to bring said sealing surfaces into juxtaposition and said connector means into axial alignment, fluid actuated piston and cylinder means on one of the connector means for moving one of the sealing surfaces into pressure sealed engagement with the other sealing surface, and a mechanical lock means on one of the connector means for maintaining such pressure sealed relation in the event of loss of pressure in the fluid actuating means.

Various other objects and advantages of the present invention will be readily apparent from the following description of the drawings in which an exemplary embodiment of the invention is shown.

IN THE DRAWINGS:

FIG. 3 is a fragmentary, generally quarter sectional view of the locking device shown in FIG. 2 showing actuation of the fluid locking device toward an unlocked position.

FIG. 4 is a fragmentary sectional view similar to FIG. 3 showing the fluid locking device in unlocked position.

FIG. 5 is a fragmentary, generally quarter sectional view of the locking device shown in FIG. 2, the locking device being shown in both hydraulically unlocked position and mechanically unlocked position.

FIG. 6 is a transverse sectional view taken in the plane indicated by line VI — VI of FIG. 2 showing the mechanical lock in locked position, the pressure fluid conducting tube of FIG. 2 being omitted for purposes of clarity.

Figure 1:
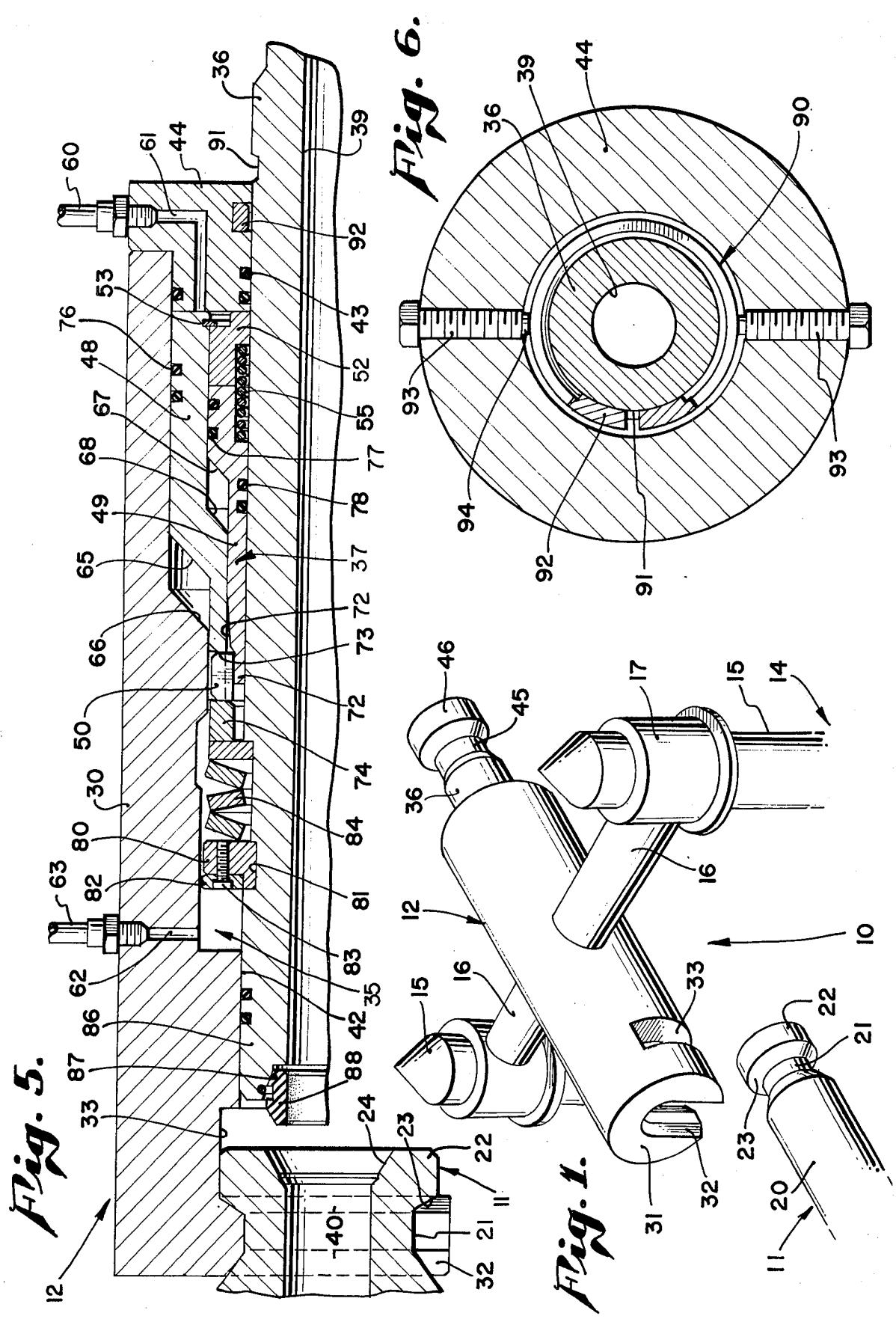
FIG. 1 is a fragmentary perspective view of a flowline connector device embodying this invention and showing a connector means secured to a subsea station and a fragmentary end of a connector means provided on the end of a flowline, the latter connector means being separated from the subsea station connector means.

In FIG. 1, there is shown a flowline connector device, generally indicated at 10, which includes a flowline connector means 11 and a second connector means 12 adapted to be secured to a subsea installation in suitable manner. Flowline connector means 11 is fragmentarily shown, it being understood that the connector means 11 is attached to the end of a flowline which may be laid along a sea floor and extend from a subsea well installation to a subsea station carrying connector means 12. In this example, a subsea station is generally indicated at 14, only a portion of which is shown; namely, a pair of upstanding guide posts 15 which may be secured to a subsea station frame structure such as shown in copending application Ser. No. 743,586 owned by a common assignee. Connector means 12 is located at one end of said subsea station and provides a connection between fluid conducting lines provided on said station and the flowline provided with connector means 11.

Connector means 12 may be fixedly secured and supported in generally horizontal position by laterally extending arms 16 which carry at their ends cylindrical connector sleeves 17 which receive guide posts 15 for rigidly supporting and positioning the connector means 12 on the subsea station 14.

Flowline connector means 11 includes a cylindrical member 20 having a reduced neck portion 21 defining a head 22 which forms an annular engagement groove 23. Head portion 22 has an axially directed outwardly flared sealing surface 24.

Connector means 12 includes a connector body member 30 of cylindrical form having means at one end thereof for lateral reception of head 22 of connector means 11. Such reception means includes a yoke 31 at one end of body member 30 providing a radially extending slot 32 which leads to a part-cylindrical recess 33. Flowline connector means 11 may be moved laterally with respect to its axis and the axis of body member 30 with the annular groove 23 and reduced portion 21 received within slot 32 and head 22 received within the part-cylindrical recess 33. As noted in FIGS. 2, 3, 4 and 5, the yoke 31 and the head 22 and groove 23 are snugly received within the yoke and relative axial movement of the connector means 11 and 12 is restrained. Connector means 11 may be supported vertically in yoke 31 by suitable means not shown, such means including a supporting member provided on subsea station 14.

Connector means 12 includes body member 30 of cylindrical form with the end somewhat overhanging yoke 31 and is provided with an elongated chamber means, generally indicated at 35, within which is received an axially movable mandrel 36 and fluid actuated locking means 37. Mandrel 36 is provided with a throughbore 39 of the same flow area as the throughbore 40 of the connector means 11. Mandrel 36 is provided slidable sealed relation with chamber portion 42 at the end adjacent recess 33, said mandrel also having slidable sealed relation at 43 with a body end cap 44. Mandrel 36 extends beyond cap 44 and may be provided with an annular groove 45 defining a locking head 46 for suitable connection to a fluid conducting pipe on the subsea installation.

Between cap 44 and cylindrical chamber portion 42, chamber means 35 receives locking means 37 which includes a locking sleeve member 48, a lock piston member 49, lock dogs 50 carried by said lock sleeve member 48. Lock sleeve member 48 at one end carries an annular spring retainer 52 secured within the end of member 48 by a suitable lock washer 53. Retainer 52 provides a seat at 54 for one end of a coil spring 55 sleeved over mandrel 36 and having its opposite end seated at 56 against a recessed shoulder 57 provided in lock piston member 49.

Figure 2:
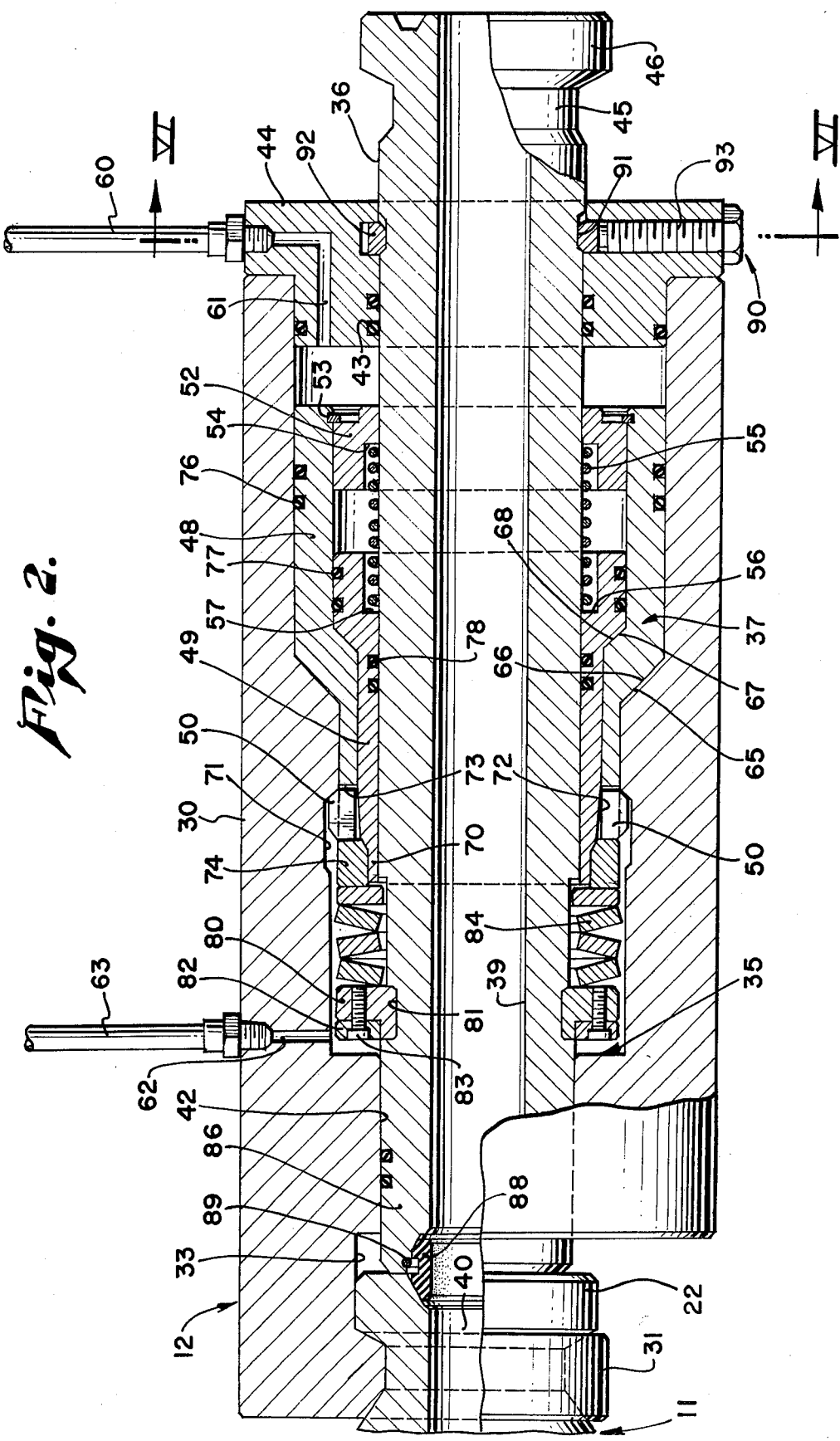
FIG. 2 is an enlarged fragmentary sectional view taken in a longitudinal plane bisecting the connector device of FIG. 1, the view showing the connector device with the connector means of the flowline and the connector means on the subsea station in locked and sealed relation.

Movement of mandrel 36 from its unsealed and unlocked position as shown in FIG. 5 to its sealed and locked position shown in FIG. 2 includes the introduction of hydraulic pressure fluid from a pressure fluid source, not shown, through fluid conducting line 60 and passageway 61 provided in the cap 44 to the chamber means 35. Pressure fluid at the opposite end of chamber means 35 is relieved through passageway 62 and fluid conducting line 63. Pressure fluid introduced through passageway 61 moves the lock sleeve member 48 toward the opposite end of body member 30 until sloping shoulder 65 abuts a corresponding shoulder 66 provided on the internal surface of body member 30. Also, relief of pressure fluid through passageway 62 facilitates the movement of the lock piston 49 toward the said opposite end of the body member by the differential in hydraulic pressure acting on the end of piston 49 and by the mechanical action of the compressed coil spring 55. The lock piston member 49 moves axially until its inclined shoulder 67 abuts a correspondingly inclined shoulder 68 provided on the internal surface of lock sleeve member 48. FIG. 2 shows the position of the lock sleeve member 48 and the lock piston 49 in their axially displaced locking position.

In such locking position, it will be noted that the reduced end portion 70 of the piston member 49 against which locking dogs 50 seat in unlocked position has now, together with the forward end of the lock sleeve member, moved the locking dogs axially until they are opposite the lock dog recess 71 provided in body member 30. During such movement, lock dogs 50 are also urged radially outwardly by a cam surface 72 provided on the lock sleeve member adjacent to the reduced end portion 70. It will be noted that lock dogs 50 are carried in lock dog ports 73 provided in the lock sleeve member 48. In such locked position of the locking device 37, it may also be noted that the reduced end portion 70 of the locked piston has moved between the end portion 74 of the lock sleeve member so that both the lock sleeve member 48 and the piston member 49 positively position and hold the lock dogs 50 in locking interengagement with the lock dog recesses 71 in the body member 30.

The lock piston member is provided with suitable seal means 77 and 78 for sliding sealing engagement with the internal surface of the lock sleeve member 48 and with the external surface of mandrel 36.

Movement of mandrel 36 during such locking operation is provided by a split retainer ring 80 seated in an annular groove 81 in mandrel 36 and secured by a suitable ring 82 secured to the split retainer portions by suitable screw bolts 83. In locked position, Belleville type spring 84 is held in compression between retainer ring 80 and the end face of the locking sleeve member 48. Thus, when locking dogs 50 are locked in recesses 71 as shown in FIG. 2, Belleville spring 84 urges said mandrel 36 towards flowline connector means 11 held against axial movement by the yoke 31. End 86 of mandrel 36 is provided with an outwardly flared sealing surface 87 for sealing relation with a gasket 88 of suitable compressible gasket material retained in the end 86 by a retainer ring 89 carried in an annular groove in the upwardly flaring sealing surface 87. Thus, when mandrel 36 is moved axially into sealing relationship with the sealing surfaces 24 of the flowline connector means 11, gasket 88 will be compressed between said sealing surfaces 87 and 24 to provide a fluid tight seal. As seen in FIG. 2, after pressure fluid has actuated the connector means to locked position, Belleville spring 84 will exert a spring biasing force on the mandrel to maintain such sealing engagement independently of the pressure fluid. In other words, once the connector is in locked position by use of pressure fluid, pressure fluid is not required to hold such locked position, and the lock dogs are held in the lock dog recesses under spring pressure.

Means are also provided for mechanically locking mandrel 36 in fluid tight sealed relation with the fluid connector means 11, in addition to the hydraulic pressure fluid acting on lock sleeve member 48 and piston 49. It will be understood that in the event there should be a failure of pressure fluid in line 60 the sealed relationship of the mandrel end 86 might permit leakage at such sealing surfaces. When the locking device is in locked position and the sealing surfaces in fluid tight sealing relation, mechanical lock means generally indicated at 90 are placed in mandrel locked position by a diver, if the depth of water permits, or by a submarine vessel or robot. Mechanical lock means 90 comprises an annular groove 91 in mandrel 36 at end cover 44. End cover 44 carries a lock ring 92, which is split, FIG. 6, and is less than 360°. Lock ring setting bolts 93 are carried by end cover 44 in diametrically opposite relation and are threaded therein. Inner ends of bolts 93 seat on arcuate portions of lock ring 92 as at 94. As bolts 93 are tightened and threaded radially inwardly, the ends cause deflection of the lock ring 92 into the recess 91 on the mandrel and provide a mechanical interlock with the mandrel which restrains axial movement thereof relative to the body member 30. Thus, the mechanical lock means 90 will maintain the sealed fluid tight relationship of the sealing surfaces 87 and 24 with respect to the gasket 88.

Unlocking of the locking device 37 to permit separation of the sealed surfaces of the mandrel 36 and the flowline connector 11 is best shown in FIGS. 3 and 4. In each figure, the manual lock means 90 is shown in unlocked position, lock bolts 93 having been loosened to permit the split lock ring 92 to expand and to move out of annular groove 91. Locking device 37 is actuated to unlocked position by relief of pressure fluid from pressure line 60 and by introduction of pressure fluid through fluid line 63 into the forward end of the chamber means 35. Pressure fluid in chamber means 35 at the Belleville washer 84 first acts upon the lock piston 49 to move the piston rearwardly and to compress spring 55. Such movement of lock piston 49 separates cam surface 72 from supporting relation of lock dog 50 and moves the reduced end portion 70 beneath dog 50. Fluid pressure acting against the radially outwardly directed surfaces of the lock dog cause the lock dog to move radially inwardly for seating on the reduced end 70. As fluid pressure continues to act on both lock piston 49 and lock sleeve member 48, both are urged rearwardly until they seat against end cover 44. In this position, lock dogs 50 are retracted fully and are held between end portion 70 and the opposed internal surface of body member 30. In the unlocked position shown in FIG. 4, it should be noted that the Belleville washer 84 has expanded and one end thereof is seated and retained against shoulder 96 provided on mandrel 36. Mandrel 36 is then axially moved or retracted by pressure fluid acting against retainers 80, 82 until it reaches the position shown in FIG. 5 wherein the sealing gasket 88 is withdrawn from the head 22 of the flowline connector means 11. Flowline connector means 11 may then be dropped downwardly for disengagement with the yoke 31.

The advantages of the above described flowline connector device are readily understood. First, a flowline connection is capable of being made by lateral relative movement of mating connector means with minimal axial movement; namely, the distance mandrel 36 travels between locked sealed position and unlocked unsealed position. In subsea well operations, such lateral connections are advantageous because relative movement of a flowline in a longitudinal direction with respect to a mating connector is often difficult, requires special equipment, and in some circumstances such a flowline may be immovable longitudinally.

Second, the flowline connection is made under hydraulic pressure and while the connector means are in locked relation, a mechanical lock means is actuated so that in the event there should be a drop in pressure fluid which acts to maintain the sealed relationship, the mechanical lock will maintain such sealed relationship. Thus, in subsea operations, a reliable fluid tight sealed condition of the mating connector parts is maintained until the manual lock is released.

Third, the snug interengagement of the level surfaces on yoke 31 with the neck portion 21 of the flowline connector, together with juxtaposed outwardly flaring seal surfaces 24 and 87 with the generally triangular section gasket 88 therebetween assures a fluid tight sealing relationship when the connector device is in pressure locked condition.

It will be understood that various modifications and changes may be made in the flowline connector device described above which come within the spirit of this invention and all such changes and modifications coming within the scope of the appended claims are embraced thereby.

We claim:

1. In a flowline connector device for a flowline wherein a connector means is laterally engaged and a seal is provided between axially related connector means, the combination of:
   a first connector means adapted to be secured to the end of the flowline, said connector means having a sealing surface;
   a second connector means adapted to be secured to a subsea installation, said second connector means having a sealing surface;
   means on said connector means for interengagement of said connector means by movement of one connector means in a lateral direction to bring said sealing surfaces into juxtaposition and said connector means into axial alignment;
   and fluid actuated piston and cylinder means on one of said connector means for moving one of said sealing surfaces into pressure sealed engagement with the other sealing surface.

2. A connector device as stated in claim 1 including means on said fluid actuating piston means for locking said first and second connector means with said sealing surfaces in pressure sealed relation.

3. In a connector device as stated in claim 1 including means on one of said connector means for mechanically locking said first and second connector means in sealed relation.

4. In a connector device as stated in claim 3 wherein said mechanical locking means includes
   a contractable lock ring on one of said connector means;
   and means for securing said lock ring in contracted position.

5. In a connector device as stated in claim 1 including one of said connector means including a body member fixed to said subsea installation;
   and a mandrel carried by said body member movable relative thereto to move one of said sealing faces into sealing relation with the other sealing face.

6. In a connector device as stated in claim 5 wherein said mandrel includes an annular groove; and a mechanically actuated lock ring on said body member for locking engagement with said groove on said mandrel for holding said mandrel against axial movement.

7. In a connector device as stated in claim 1 wherein said means for moving one of said sealing surfaces towards the other sealing surface includes
   a body member on one of said connector means;
   a lock sleeve member in said body member;
   a lock piston within said lock sleeve member;
   a lock dog carried by said lock sleeve member and movable radially outwardly by said lock piston;
   said body member having a dog recess for reception of said lock dog;
   a mandrel movable axially relative to said body member;
   and spring means biasing said mandrel and said lock sleeve member for maintaining sealed relationship of said sealing surfaces.

8. A flowline connector device for a flowline adapted to carry a connector member for lateral engagement with a connector means on a subsea station, the combination of:
   said connector means including an elongated connector body member having an axially extending chamber;
   a mandrel movable within said chamber and having sealing surfaces at one end thereof;
   a locking means between said mandrel and said body member for hydraulically locking said mandrel in one position;
   said connector member on said flowline having a sealing surface for engagement with said sealing surface on said mandrel;
   and means on said body member for lateral reception of said connector member on the end of said flowline for positioning said sealing surface on said connector member for sealing engagement with the sealing surface on said mandrel.

9. A connector device as stated in claim 8 including mechanically actuated lock means for locking said mandrel in said one position for holding said sealing surfaces in pressure sealed engagement.

10. A flowline connector device substantially as shown and described.

* * * * *